United States Patent

Gerstenberg

[15] 3,664,931

[45] May 23, 1972

[54] METHOD FOR FABRICATION OF THIN FILM CAPACITOR

[72] Inventor: Dieter Gerstenberg, 448 Benner Rd., Allentown, Pa. 18104

[22] Filed: July 27, 1970

[21] Appl. No.: 58,434

Related U.S. Application Data

[63] Continuation of Ser. No. 445,895, Apr. 6, 1965, abandoned.

[52] U.S. Cl. ............................204/38 A, 204/56, 204/298
[51] Int. Cl. ....................C23f 17/00, C23c 15/00, C23b 9/00
[58] Field of Search.....................117/201; 204/38 A, 298, 56

[56] References Cited

UNITED STATES PATENTS 3,242,006  3/1966  Gerstenberg .......................... 117/201
2,993,266  7/1961  Berry .................................... 29/25.42

*Primary Examiner*—John H. Mack
*Assistant Examiner*—R. L. Andrews
*Attorney*—R. J. Guenther and Edwin B. Cave

[57] ABSTRACT

Thin film capacitors including a dielectric layer obtained by anodizing a layer obtained by sputtering a film-forming metal in a nitrogen or carbon containing ambient at partial pressures ranging from $10^{-3}$ to $10^{-5}$ torr. manifest marked improvement with regard to initial leakage and life test failure as compared with conventional prior art capacitors.

5 Claims, 5 Drawing Figures

INVENTOR
D. GERSTENBERG
BY
ATTORNEY

METHOD FOR FABRICATION OF THIN FILM CAPACITOR

This application is a continuation of copending application Ser. No. 445,895, filed Apr. 6, 1965 and now abandoned.

This invention relates to a technique for the fabrication of thin film capacitors utilizing a film-forming metal sputtered in the presence of a gas as one of the electrodes, an anodized film of said layer as the dielectric and an electrically conductive counter-electrode, and relates to capacitors produced by such techniques.

Anodized electrodes of film-forming metals such as tantalum, niobium, zirconium and titanium have been employed in the fabrication of three general types of capacitor. The wet electrolytic is the prototype of this group and includes an anodized electrode immersed in a suitable liquid electrolyte, the container which holds the anodized electrode and electrolyte, typically, serving as the second electrode of the capacitor.

The next step in capacitor technology involved the development of the solid electrolytic capacitor. This type of capacitor generally takes the form of an anodized porous body which is coated successively with a layer of manganese dioxide and a layer of an electrically conductive metal which serves as the second electrode. The manganese dioxide employed in this device serves the purpose of the liquid electrolyte in the wet electrolytic, and facilitates the healing or rebuilding of discontinuities or irregularities in the dielectric film.

The most recent capacitor, referred to as the printed capacitor, is constructed by depositing a layer of a film-forming metal upon a substrate, for example, by sputtering or vacuum evaporation, anodizing the deposited layer to form an oxide film and finally depositing a counter-electrode in direct contact with the anodized film.

The printed capacitor represents the ultimate objective in the development of capacitors employing an electrode comprising a film-forming metal. The manner in which the film-forming electrode is produced apparently minimizes the presence of defects or irregularities in the anodized dielectric film, so obviating the need for any electrolyte medium. Accordingly, the simplicity and ease of fabrication of this type of capacitor renders it eminently well suited for use in printed circuits.

The dielectric materials commonly utilized in thin film circuitry manifest several outstanding characteristics which favor their use, for example, high dielectric breakdown strength, high capacitance to area ratio, mechanical and electrical stability, et cetera. Nevertheless, certain disadvantages have been observed with respect to initial yield and life test performance, so prompting workers in the art to direct their efforts toward refinements of the printed capacitor.

In accordance with the present invention, the prior limitations are effectively overcome by modifying the conventional procedure for the fabrication of printed capacitors by cathodically sputtering a film-forming metal in a nitrogen or carbon containing gaseous ambient at partial pressures ranging from $10^{-3}$ to $10^{-5}$ torr. and completing the device by conventional techniques. The resultant devices evidence a marked improvement with regard to initial leakage and life test failures as compared with conventional prior art devices.

The invention will be more readily understood from the following detailed description taken in conjunction with the accompanying drawing wherein.

Figure 4:
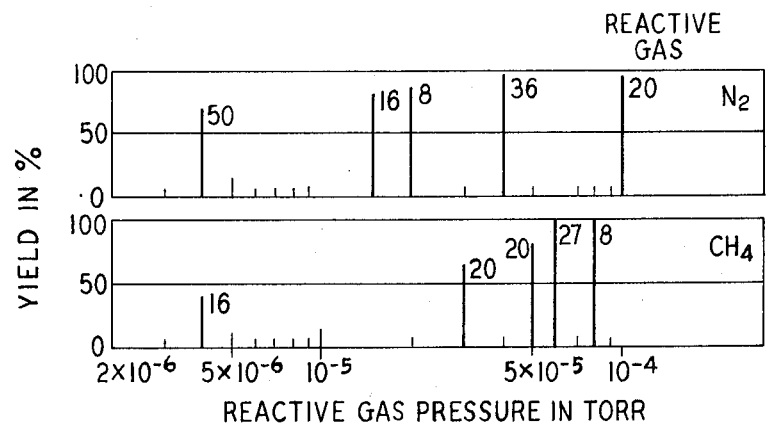
Figure 5:
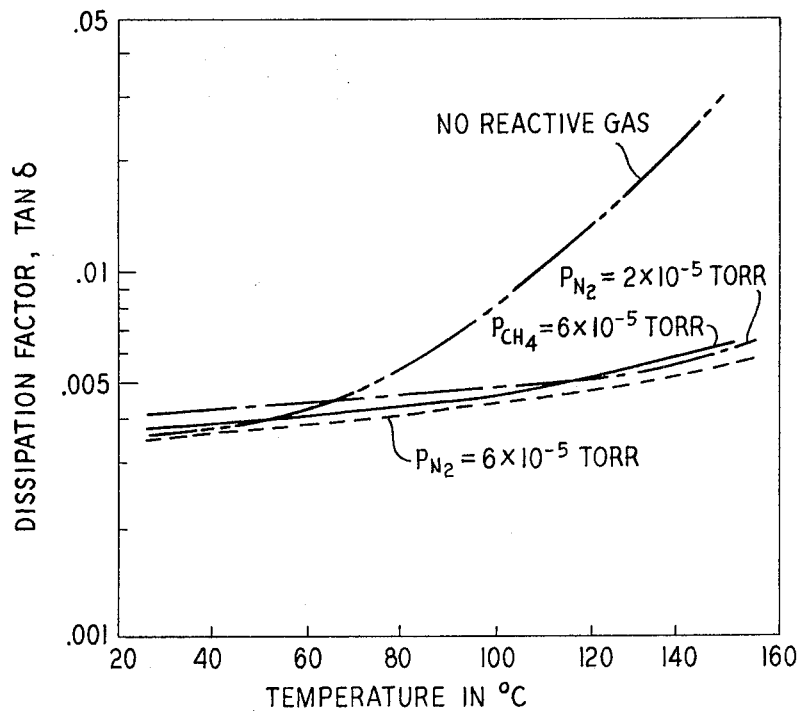

FIG. 4 is a graphical representation on coordinates of yield in per cent against reactive gas pressure in torr. showing the number of samples fabricated in accordance with the present invention which manifest leakage currents less than $10^{-8}$ amperes at 75 volts; and FIG. 5 is a graphical representation on coordinates of dissipation factor, tan δ, against temperature in degrees Centigrade comparing prior art devices with those described herein.

Figure 1:
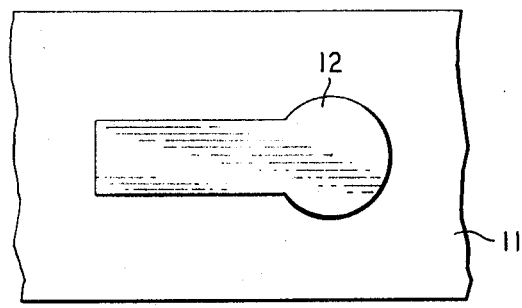
FIG. 1 is a plan view of a substrate with a sputtered layer deposited thereon in a desired pattern in accordance with the present invention.

With further reference now to FIG. 1, there is shown a substrate 11 upon which a pattern is to be produced in accordance with the present invention. The inventive technique requires the use of a substrate material which is smooth (average peak to valley of 1 micro inch) in nature such as glasses, glazed ceramics, et cetera. The substrate selected should desirably be able to withstand temperatures ranging as high as 500° C. since they may be subjected to such temperatures during the deposition stage of the processing.

The first step in the inventive technique comprises cleansing the substrate by conventional techniques well known to those skilled in the art. Following the cleansing step, a layer 12 is deposited thereon by cathodic sputtering of a cathode comprising a film-forming metal in a desired configuration (as described by L. Holland in "Vacuum Deposition of Thin Films," J. Wiley and Sons, 1956) in the presence of a sputtering gas selected from among nitrogen and a carbon containing gas, such as methane, carbon monoxide, et cetera, at partial pressures ranging from $10^{-3}$ to $10^{-5}$ torr. It has been determined that the use of partial pressures less than $10^{-5}$ torr results in the formation of a film of high purity which does not evidence the marked improvement in characteristics described above, whereas the use of pressures greater than $10^{-3}$ torr results in the formation of undesirable compounds. The film-forming metals of interest are those whose oxides are known to be excellent dielectric materials and include tantalum, aluminum, niobium, titanium and zirconium.

Figure 2:
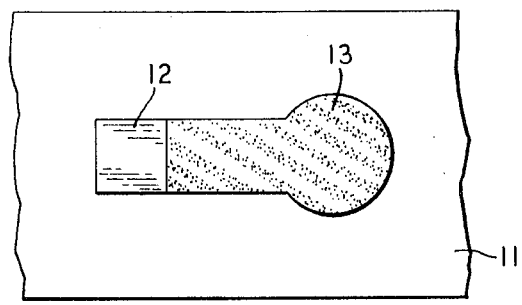
FIG. 2 is a plan view of the body of FIG. 1 after anodization.

Following the deposition step, layer 12 is anodized in an appropriate electrolyte, so resulting in the formation of a dielectric layer 13, shown in FIG. 2. Suitable electrolytes for this purpose are oxalic acid, citric acid, et cetera.

Figure 3:
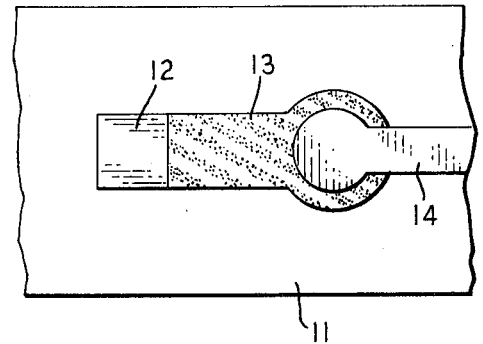
FIG. 3 is a plan view of the body of FIG. 2 after the deposition thereon of a counter-electrode.

The last step in the fabrication of a capacitor in accordance with this invention is the application of a counter-electrode 14, shown in FIG. 3, in contact with dielectric layer 13. Any suitable method for producing an electrically conductive layer on the surface of the dielectric layer is suitable provided such method does not mechanically or thermally disturb the dielectric layer. Vacuum evaporation has been found to be especially suitable for producing counter-electrodes in accordance with this invention, metals such as aluminum and gold being conveniently used.

Examples of the present invention are described in detail below. These examples are included merely to aid in the understanding of the invention, and variations may be made by one skilled in the art without departing from the spirit and scope of the invention.

EXAMPLE I

A glass microscope slide, approximately 1½ inches in width and 3 inches in length was used as a substrate. Next, the slide was washed in a detergent to remove large particles of dirt and grease. Next, there followed a tap water rinse, a 10-minute boil in a 10 percent hydrogen peroxide solution, a distilled water rinse, a ten minute boil in distilled water and storage in an oven maintained at 150° C. until ready for use.

Next, the cleansed slide was inserted in a sputtering chamber having a tantalum cathode and the chamber evacuated by means of a roughing pump and turbo-molecular pump to a pressure of approximately $2 \times 10^{-7}$ torr after a time period within the range of 30 to 45 minutes. Following, the substrate was heated to a temperature of approximately 400° C. After attaining such temperature, methane was admitted into the chamber at a dynamic pressure and, after obtaining equilibrium, argon was admitted into the chamber at a pressure of approximately 20 microns. During the sputtering process, the partial pressure of the methane was maintained at approximately $2.6 \times 10^{-4}$ torr.

In the apparatus employed, the anode and cathode were spaced approximately 2.5 inches apart, the cleansed substrate being placed therebetween at a point immediately without Crooke's Dark Space. A d-c voltage of 5,000 volts was impressed between cathode and anode. In order to establish equilibrium when first beginning the sputtering, it was found helpful to sputter on a shield for several minutes, thereby assuring reproducible results. Sputtering was conducted for approximately 20 minutes, resulting in a layer of 4,000 Angstroms.

Following, the sputtered layer was anodized in an 0.01 per cent aqueous solution of citric acid at an initial current density of 1 milliampere/cm$^2$ until a formation voltage of 130 volts was attained. Constant voltage was maintained for one-half hour, the slide removed and electrochemically etched for 5 seconds at 90 volts in a solution of aluminum chloride in methanol. The slide was then returned to the anodization solution for 30 minutes. Finally, gold counter-electrodes were evaporated through mechanical masks yielding 20 capacitors.

Initial yield was determined by measuring the leakage current after application of 75 volts d-c for one minute. Following, life tests were performed at 50 v and 65 v at 85 and 110° C. Initial yields were based on a leakage current of $10^{-8}$ amperes as a maximum. Life test failure was considered a loss in capacitance of 10 percent or more compared to the original value or a leakage of more than $5 \times 10^{-6}$ amperes. The yield for the capacitors produced in the described manner was 100 percent and only one life test failure was reported after 2 weeks.

For comparative purposes the described procedure was repeated in the absence of methane. The yield was found to be 93 percent, and 35 percent of the capacitors failed after one-half week on life test.

EXAMPLE II

The procedure described in Example I was repeated with various partial pressures of nitrogen and methane and yields determined as outlined above. The results are shown in FIG. 4 in graphical form. As noted, yields are significantly improved as a result of the inventive processing, approaching 100 percent in many instances as compared with processes utilizing trace quantities of nitrogen or methane.

EXAMPLE III

The procedure described in Example II was repeated and the dissipation factor, tan δ, determined as a function of temperature. For comparative purposes, a control run was performed by sputtering in the absence of a reactive gas. The results set forth in the graph shown in FIG. 5 clearly indicate a marked improvement in the dissipation factor.

While the invention has been described in detail in the foregoing specification, and the drawing similarly illustrates the same, the aforesaid is by way of illustration only and is not restrictive in character. It will be appreciated that the several modifications which will readily suggest themselves to persons skilled in the art are all considered within the scope of this invention, reference being had to the appended claims.

What is claimed is:

1. A method for the fabrication of a thin film capacitor which comprises the steps of depositing a layer upon a substrate in a desired pattern by cathodic sputtering of a film-forming metal in the presence of a gas selected from the group consisting of nitrogen and a carbon containing gas at a partial pressure within the range of $10^{-3}$ to $10^{-5}$ torr, electrolytically anodizing said deposited layer, thereby forming a dielectric layer, and depositing an electrically conductive counter-electrode upon said dielectric layer.

2. A method in accordance with claim 1 wherein said gas is nitrogen.

3. A method in accordance with claim 1 wherein said gas is methane.

4. A method in accordance with the procedure of claim 1 wherein said film-forming metal is tantalum.

5. A method in accordance with claim 4 wherein said gas is nitrogen.

* * * * *